United States Patent [19]

Matheopoulos

[11] Patent Number: 4,580,829
[45] Date of Patent: Apr. 8, 1986

[54] ADJUSTABLE BIDIRECTIONAL VEHICLE VISOR

[76] Inventor: Paul C. Matheopoulos, 300 Rosemont St., Calexico, Calif. 92231

[21] Appl. No.: 613,561

[22] Filed: May 24, 1984

Related U.S. Application Data

[63] Continuation-in-part of Ser. No. 565,576, Dec. 27, 1983, abandoned.

[51] Int. Cl.$^4$ .............................................. B60J 3/00
[52] U.S. Cl. ............................ 296/97 C; 296/97 R; 296/97 K; 16/334; 16/243; 248/283
[58] Field of Search ................. 296/97 R, 97 H, 97 J, 296/97 K, 97 C; 160/DIG. 3; 16/329, 331, 332, 333, 334, 344, 345, 347, 242.3, 362.3; 248/282, 283, 289.1, 916

[56] References Cited

U.S. PATENT DOCUMENTS

| | | | |
|---|---|---|---|
| 2,261,881 | 11/1941 | Horstmann | 296/97 C |
| 2,878,714 | 3/1959 | Van Denburg | 296/97 K |
| 3,008,757 | 11/1961 | Sinnett | 296/97 G |
| 3,074,756 | 1/1963 | Howe | 248/289.1 |
| 3,159,421 | 12/1964 | Samuelson | 296/97 K |
| 3,191,986 | 6/1965 | Simon | 296/97 K |
| 3,201,170 | 8/1965 | Weingarten | 296/97 C |
| 3,383,132 | 5/1968 | Stamp | 296/97 C |

FOREIGN PATENT DOCUMENTS

| | | | |
|---|---|---|---|
| 201166 | 2/1938 | Switzerland | 16/334 |
| 327206 | 3/1958 | Switzerland | 16/332 |

Primary Examiner—Robert B. Reeves
Assistant Examiner—Russell D. Stormer
Attorney, Agent, or Firm—Brown, Martin & Haller

[57] ABSTRACT

A vehicle windshield visor affording adjustable protection from the sun and glare ahead and from the side of the vehicle is disclosed. An opaque first visor has a second similarly shaped but transparent and tinted visor supported in a pivotal relationship to the first visor. A hinge assembly sleeve supports the second visor along an edge of the first visor. A hinge assembly shaft supports the sleeve which is rotatable and extendable with relation to the shaft. Detents on the shaft engage longitudinal channels formed in the sleeve to permit selective rotation and extension of the sleeve with respect to the shaft. In one embodiment, the hinge assembly and second visor are removably attached to the first visor. In a variation of this first embodiment, the hinge assembly and second visor are permanently attached to the first visor pivotal support member. In a second embodiment, the first and second visors are both mounted on the sleeve. In a third embodiment, the sleeve is held in a single position relative to the shaft.

4 Claims, 10 Drawing Figures

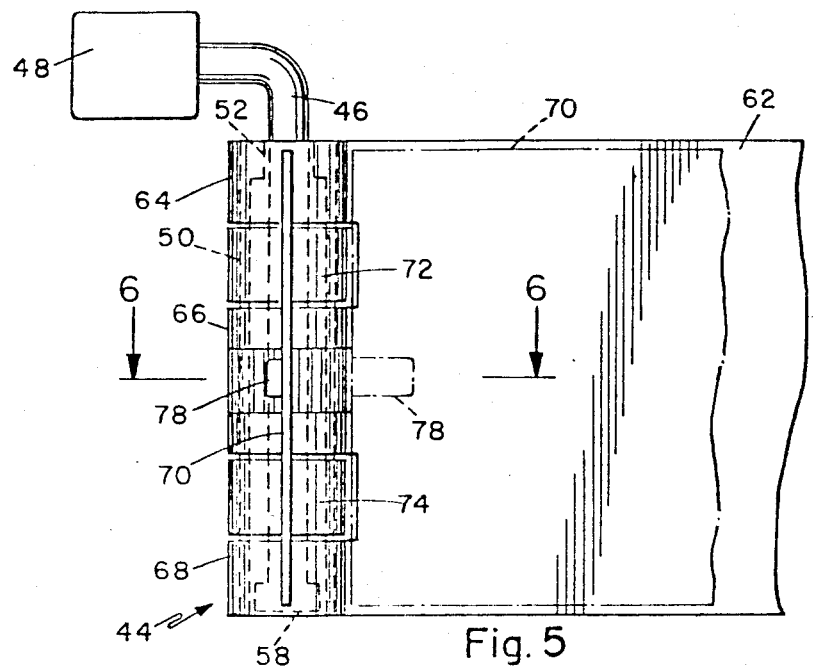
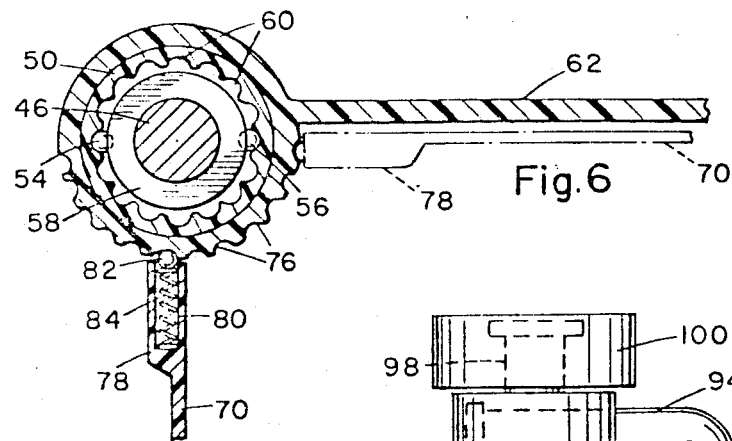
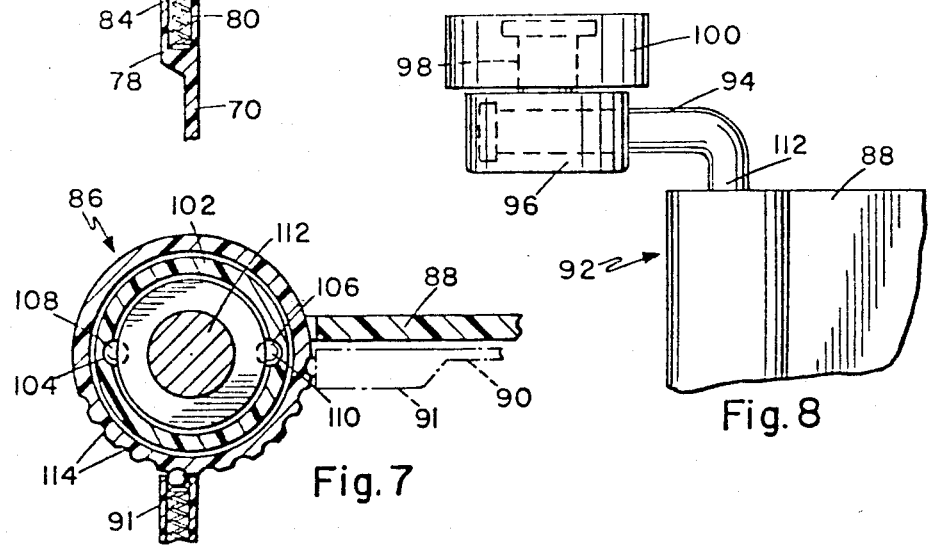

ADJUSTABLE BIDIRECTIONAL VEHICLE VISOR

REFERENCE TO RELATED APPLICATIONS

This application is a Continuation-In-Part of my application Ser. No. 565,576, filed Dec. 27, 1983, now abandoned.

BACKGROUND OF THE INVENTION

The invention relates to vehicle windshield visors and particularly to a visor capable of providing driver glare protection from ahead and the side of a vehicle simultaneously, and extendable for greater vertical windshield coverage.

The adverse effects of the rays of the sun upon the vision and comfort of a driver when a vehicle is being driven into the sun and from the glare of oncoming headlights of other vehicles is a familiar driving experience. When the sun is low on the horizon, as in the early morning and late afternoon, a driver can be blinded by its glare with consequent hazard. It is often necessary to drive on a curving roadway when the sun is near the horizon with the result that the glare from the sun shifts alternately from the front to the side of the vehicle with turns in the road. To shield the driver, it is desirable to have a windshield visor to minimize the adverse effects from both directions simultaneously without the effort and distraction caused by the need to reposition the visor with each change in direction.

The conventional vehicle windshield visor has a single opaque panel, which can be pivoted about a horizontal axis between a stored position against the interior of the roof of the vehicle to operating positions in which some of the sun's rays are prevented from reaching the eyes of the driver. It is shaped and positioned such as to block the effects of the sun when the latter is at a norminal angle with respect to the horizon, but does not afford protection at low angles and from oncoming vehicle headlights. The mounting of a conventional visor also provides for rotation about a vertical axis so that it may be positioned generally parallel to the side of the vehicle. However, to obtain effective side protection, the driver must rotate the visor, and thus give up protection ahead. The conventional vehicle visor has fixed dimensions and position relative to the area of the windshield, and is not extendable or adjustable to establish glare protection against the sun at low angles or from road and vehicle sources.

Variations of the conventional vehicle visor design and attachable devices are available directed primarily to providing downward extensions of the visor, but none are known to the applicant that are capable of providing a simultaneous front and side shield, as well as being readily adjustable for low level glare protection. Applicant's invention overcomes these latter deficiencies.

SUMMARY OF THE INVENTION

In accordance with the precepts of the invention, a vehicle visor is provided that incorporates an opaque first visor, and a second transparent tinted visor both pivotally mounted to the vehicle adjacent the windshield for rotation about a substantially horizontal axis between a stored position and operating positions. The second visor overlays the first visor in the stored position, and is selectably pivotal about a generally vertical edge of the first visor when in an operating position to permit shielding both the front and side of the vehicle operator simultaneously. In one illustrated embodiment, this capability is achieved by attaching a second visor to a sleeve so as to rotate therewith. The sleeve fits over and is rotatable about a mounting shaft having spring biased detents at one or both ends. Longitudinal channels formed circumferentially in the internal surface of the sleeve engage the shaft detents to provide for selectable rotational of the sleeve with respect to the shaft. The detent and channel arrangement also permits the sleeve to move longitudinally with respect to the shaft. Indentations spaced along the channels are engaged by the detents to maintain a selected vertical position of the sleeve with respect to the shaft.

A spring clamp on the end of the mounting shaft opposite the detent provides for the attachment of the shaft and sleeve along the outboard edge of a conventional, or first visor. A variation of this embodiment suitable for vehicle initial installations provides for fixed attachment of the end of an L-shaped mounting shaft, opposite the detent end, to the first visor pivotal support member adjacent the outboard edge of the first visor. The design of the first illustrated embodiment thus allows the transparent visor to be both selectively rotated with respect to the first visor for side coverage, and/or extended therefrom parallel to the plane of the first visor to provide improved lower windshield coverage without preventing the view of the road ahead or to the side of the vehicle.

In a second embodiment, the mounting shaft is pivotably attached to the vehicle for rotation about a horizontal axis as before. However, both the first and second visors are attached to the sleeve, and thus are rotatable therewith with respect to the mounting shaft, and slidable along the shaft. Provision is made for selectively rotating the second visor with respect to the first visor for side protection by providing longitudinal channels on the exterior of the sleeve connection of the first visor. A spring biased detent on the second visor engages these channels to maintain a desired position of the second visor with respect to the first visor. In this configuration, the two visors may be moved together vertically to provide increased low angle glare protection.

In a third illustrated embodiment of the invention, the support shaft to which the visors are attached has a pivotal mounting to the vehicle for rotation about a vertical axis as well as a horizontal axis. As a consequence of the increased pivotal freedom afforded the visor by the shaft mounting to the vehicle, the shaft and sleeve of the second embodiment is simplified by having the shaft detent engage a single pair of diametrically spaced longitudinal channels formed in the interior surface of the sleeve. The rotational position of the sleeve with respect to the shaft is thus fixed by the shaft detent, while the independent rotation of the second visor with respect to the first is provided as in the second embodiment.

The primary object of the invention is to provide a new and improved adjustable bidirectional vehicle visor to protect the vision and comfort of a driver against the rays of the sun, road, and other vehicle glare. The visor is capable of providing simultaneous protection from the latter sources emanating from the front and side of the vehicle. It is easily positionable and readily extendable to provide selected windshield area coverage without unduly restricting the vision of a driver. The visor of the present invention is compact, versatile, and relatively inexpensive to manufacture. It has features that make it readily adaptable to the space and arrangement constraints of different vehicles. In one illustrated embodiment, these features and capabilities may be quickly and easily attached to a conventional visor to convert it to an adjustable bidirectional visor combination. In a variation of this first embodiment, the previously described second visor shaft and sleeve arrangement is permanently attached to the first visor pivotal support member to provide a fixed installation. Further objects and advantages of the invention will become apparent upon a reading of the following detailed description in conjunction with the drawings wherein like numerals refer to like parts throughout and in which:

FIG. 5 is a view similar to FIG. 2, showing an alternative mounting arrangement;

FIG. 6 is an enlarged sectional view taken on line 6—6 of FIG. 5;

FIG. 7 is a view of a simplified configuration of the sleeve and shaft arrangement depicted in FIG. 6 employed with the alternative attachment of FIG. 8;

FIG. 8 is a side elevation view of an alternative attachment bracket incorporating two pivots;

DETAILED DESCRIPTION OF THE DRAWINGS

Figure 1:
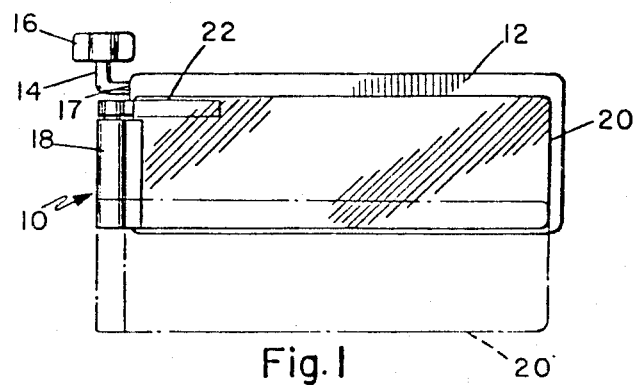
FIG. 1 is a rear view of a typical vehicle visor with the second visor attached.
Figure 2:
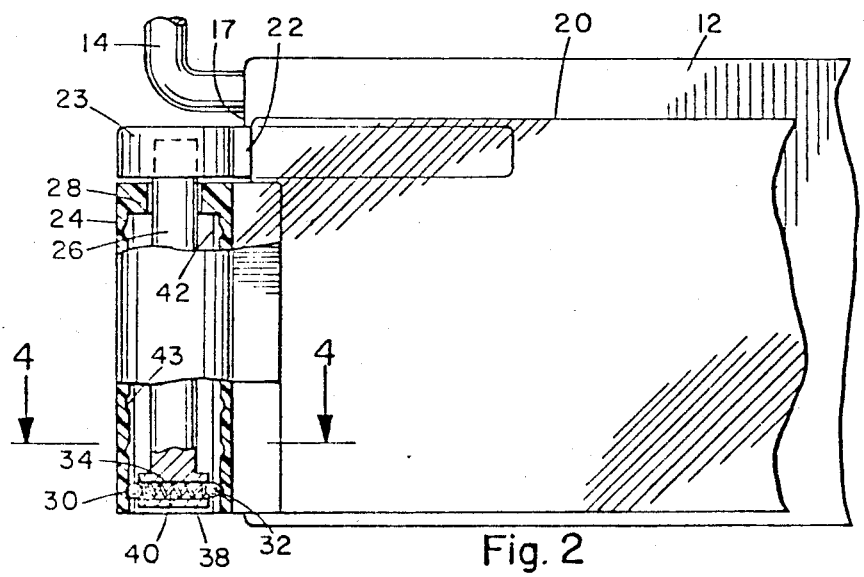
FIG. 2 is an enlarged view of the visor attachment structure with portions cut away.
Figure 3:
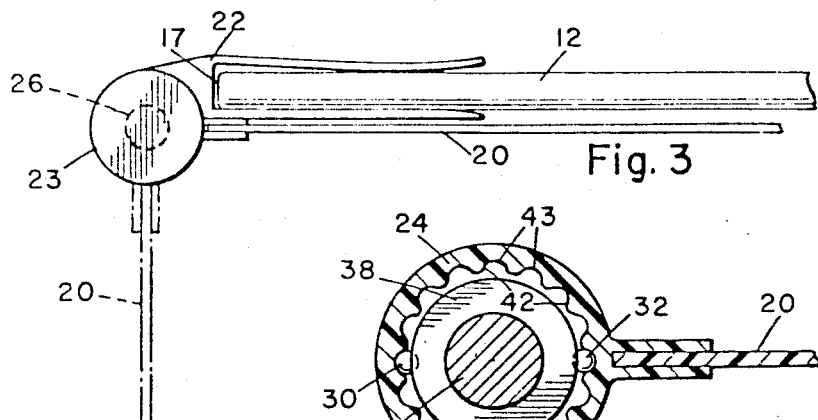
FIG. 3 is a top plan view of the structure of FIG. 2.

An illustrated embodiment of the bidirectional visor 10 capable of providing simultaneous front and side glare protection in combination with a typical opaque vehicle visor, hereafter referred to as the first visor, is illustrated in FIGS. 1 through 4. In FIGS. 1 and 2, the visor 10 is illustrated as it would be viewed by a driver. The first visor 12 is pivotally mounted on a rod 14 along its upper edge. Rod 14 is attached to the interior roof of the vehicle, not shown, adjacent to and above the windshield by a bracket 16 such that the rod 14 has a substantially horizontal orientation. The rod 14 is also rotatable in the bracket 16 about a vertical axis to provide side protection. The arrangement is such that the visor 12 may be folded against the roof of the vehicle for storage, or be pivoted downwardly between the driver and the windshield of the vehicle as depicted in FIG. 1. The simultaneous front and side protection feature is provided by the attachment of a second visor 20 along the outboard edge 17 of visor 12 as illustrated in FIG. 1 by means of a hinge assembly 18 to which the second transparent tinted visor 20 is attached. The visor 20 is of such size and shape as to overlay substantially the first visor 12 when in the stored position indicated by the solid lines of FIG. 1. The hinge assembly 18 is attached to the first visor 12 by a spring clamp 22. As will be subsequently described, the configuration and attachment of the hinge assembly 18 is such that the second visor 20 may be selectively pivoted about an axis parallel to the edge 17 of the visor 12, as illustrated in FIG. 3, and extended in a plane parallel to the first visor 12 to a position indicated by the broken lines of FIG. 1. Thus, the second visor 20 may be used to protect the driver from sources of glare emanating from the side of the vehicle and/or extend the protection afforded by the first visor 12 in a forwardly direction from glare or oncoming vehicle headlights. The transparent tinted nature of the second visor 20 in the latter function does not block the vision of the driver.

Figure 4:
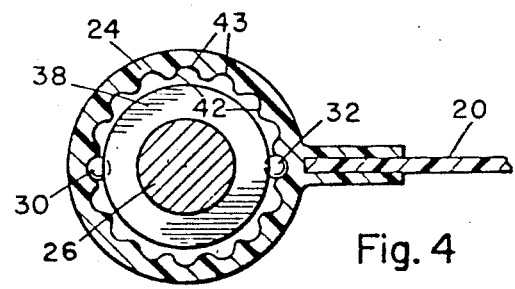
FIG. 4 is an enlarged sectional view taken on line 4—4 of FIG. 2.

The construction of the hinge assembly 18 is further illustrated in FIGS. 2, 3, and 4. The hinge assembly 18 includes a sleeve 24 which surrounds and is supported upon a shaft 26 such that it is rotatable about, and extendable along the shaft 26 as will be subsequently described. As illustrated in FIG. 2, the sleeve 24 is supported and guided on the shaft 26 by an annular collar 28 formed internally in the sleeve which bears against the shaft 26 and by diametrically opposite detents 30 and 32 positioned in a recess 34 in a detent head 38 which is formed on the end of shaft 26. A clamp 22 is attached to the shaft 26 at the end of the shaft opposite the detent head 38. A clamp cap 23 fits over the end of the shaft 26 and is held in place by having a force fit upon the shaft, or by use of a suitable adhesive. In the embodiments illustrated, the shaft detents 30 and 32 are small ball bearings that are biased radially outward from the center of the shaft 26 by a spring 40.

Figure 9:
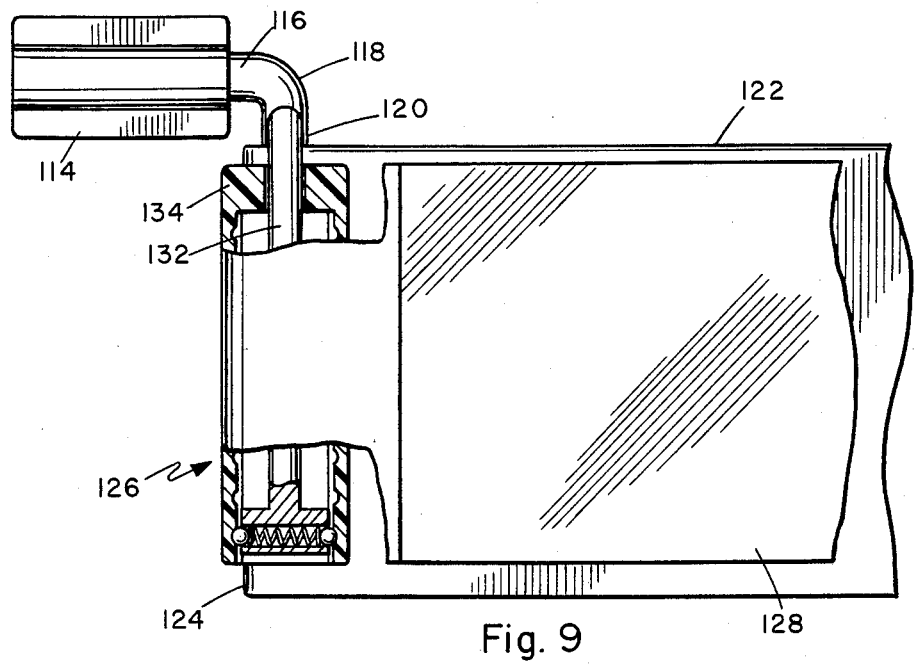
FIG. 9 is a rear view depicting the second visor assembly permanently attached to the first visor pivotal support member to form an integral bidirectional visor installation.
Figure 10:
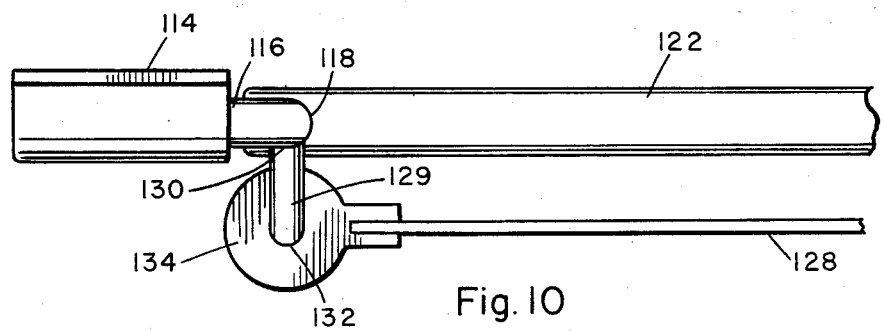
FIG. 10 is a top plan view of the structure of FIG. 9.

As illustrated in FIG. 4, the interior of the sleeve 24 is formed with circumferential longitudinal channels 42 that extend the length of the sleeve and into which the detents 30 and 32 fit to assist in guiding and maintaining the position of the sleeve 24 in relation to the shaft 26. Rotation of the sleeve 24 about the shaft 26 is achieved by manually turning the second visor 20 to the desired position. The detents 30 and 32 are depressed against the spring 40 to allow their repositioning in another channel 42. The spring force then causes the detents to bear against the channel to maintain the rotational position. The detents 30 and 32 also slide along a selected channel 42 to allow extension of the second visor 20 by repositioning the sleeve 24 along the shaft 26. As illustrated in FIG. 2, indentations 43 formed in the channels 42 and spaced at intervals along the lengths of the channels cooperate with the detents 30 and 32 to maintain a selected extended position of the second visor 20. A variation of the bidirectional vehicle visor design previously described with reference to FIGS. 1 through 4 is illustrated in FIGS. 9 and 10. This variation provides a bidirectional visor installation suitable for permanent installation in vehicles in which the second visor assembly is permanently positioned in relation to the first visor rather than being removably attachable thereto. As illustrated in FIG. 9, a mounting bracket 114 is mounted to the interior of the vehicle roof adjacent to the windshield. A shaft 116 is pivotable in hinge assembly 114 about a substantially horizontal axis. The shaft 116 has a 90 degree elbow 118 to provide a substantially vertical portion 120 for the shaft 116 when the visor is in the fully lowered operating position. The first, or opaque, visor 122 is rotatably attached at its outboard end 124 to the shaft portion 120.

Hinge assembly 126 with attached second visor 128 have the same configuration and operation as the previously described hinge assembly 18 and visor 20 illustrated in FIG. 1. However, in this variation, the hinge assembly shaft 132 is a two piece mating element to permit assembly, and has an L-shaped section 129 adjacent the mounting end of the shaft. The mounting end 130 of the hinge assembly shaft 132 is attached by welding, or other suitable means, at or adjacent to the elbow portion 118 of the shaft 116 to project therefrom and position the hinge assembly sleeve 134 in overlapping relationship with the first visor and parallel to the outboard end 124 of the first visor 122 as depicted in FIGS. 9 and 10. Use of this mounting arrangement for the hinge assembly 126 rather than the cap and clamp illustrated in FIG. 2 results in a fixed installation of the bidirectional visor.

A second embodiment of the bidirectional vehicle visor is illustrated in FIGS. 5 and 6. In this adaptation, a hinge assembly 44 is mounted to the interior of the vehicle roof adjacent to the windshield by the connection of a shaft 46 in a mounting bracket 48 attached to the vehicle by suitable means. The shaft 46 pivots in the bracket 48 about a horizontal axis above the windshield between a stored and an operating positions. The structure of the hinge assembly 44 is the same as in the first embodiment. The shaft 46 supports a sleeve 50 which passes over and is supported by the shaft 46. The sleeve 50 is supported on the shaft by the collar 52 formed in the interior of the sleeve 50 and by the detents 54 and 56, (FIG. 6), mounted in the detent head 58 formed on the end of the shaft 46. Internal longitudinal channels 60 formed circumferentially on the interior of the sleeve 50 and including spaced indentations, not again illustrated in FIGS. 5 and 6, are engaged by the spring biased detents 54 and 56 as previously described for the first embodiment of the hinge assembly. In this second embodiment, however, a first opaque visor 62 is secured to the sleeve at hinge connections 64, 66, and 68. A second visor 70 is rotatably mounted on the sleeve 50 at hinge connections 72 and 74 which are spaced between the hinge connections of the first visor 62 such that the second visor 70 is pivotal about the sleeve 50 with respect to the first visor 62. To control the rotation of the second visor 70, the first visor 62 has longitudinally formed channels 76 on a portion of the exterior surface of the center hinge connection 66. As illustrated in FIG. 6, the second visor 70 is provided with a detent assembly 78 to engage the channels 60. The detent assembly 78 includes a recessed housing 80 containing a detent ball 82 biased by a spring 84 to engage the channels 60. In FIGS. 5 and 6 the broken line representation illustrates the second visor 70 overlaying the first visor 62 in the stored position, while the solid line representation of the second visor 70 represents the visor rotated with respect to the first visor for side glare protection. By this embodiment of the invention, a bidirectional vehicle visor is provided in which rotation of a first and second visor about a generally vertical axis is achieved by rotating the sleeve 50 about the shaft 46, and in which the visors are extendable along such axis by the sliding engagement of the detent head 58 in the channels 60.

A third embodiment of the bidirectional vehicle visor 86 is illustrated in FIGS. 7 and 8. In this configuration the mounting of the first visor 88 and the second visor 90 to a hinge assembly 92 is the same as described for the embodiment of FIG. 5. Construction of hinge assembly 92 is also the same as previously described except for the shaft and sleeve internal detent arrangement, and the manner in which the shaft 94 is mounted to the vehicle. In the third illustrated embodiment, the shaft 94 is supported pivotally in a support block 96 to turn about a horizontal axis. Support block 96 is in turn pivotally supported by pivot shaft 98 to turn about a vertical axis in the mounting bracket 100. The bracket 100 is secured to the interior overhead of the vehicle by suitable means of attachment. Because of the freedom of rotational motion afforded by this mounting arrangement of the shaft 94 in positioning the visors, the positioning structure for the sleeve with relation to the shaft 112 can be simplified. Two diametrically opposite longitudinal channels 104 and 106 are formed in the internal surface of the sleeve 102 for engagement with the shaft detents 108 and 110. The operation of the visors 88 and 90 in the third embodiment illustrated in FIGS. 7 and 8 is the same as described for the embodiment of FIG. 5 except that the detents 108 and 110 are employed to establish and maintain a set rotational relationship about a vertical axis between the shaft 112 and the sleeve 102 for the first visor 88. The second visor 90 is rotationally positionable with respect to the first visor as previously described for the second embodiment.

While the present invention has been illustrated and described by means of particular embodiments and application, it is to be understood that changes and modifications may be made therein without departing from the spirit and scope of the invention as defined in the appended claims.

Having described my invention, I claim:

1. An adjustable bidirectional vehicle visor, comprising:
    a first generally rectangularly-shaped opaque visor attachable to a vehicle and pivotable about a substantially horizontal axis;
    a second transparent tinted visor supported to overlay said first visor;
    a cylindrical sleeve attached to said second visor;
    a shaft rotatable and longitudinally slidable within said sleeve;
    a plurality of longitudinal channels formed circumferentially in the interior surface of said sleeve and extending substantially the length thereof;
    detent means on said shaft for engaging said channels to control rotational relationship between said shaft and said sleeve;
    indentations formed in said channels and spaced along the lengths thereof for engaging said shaft detent means to maintain selected longitudinal positions of said sleeve with respect to said shaft; and
    means for replacably attaching said shaft to said first visor.

2. An adjustable bidirectional vehicle visor, comprising:
    a first opaque visor having a generally rectangular shape;
    a second transparent tinted visor supported to overlay said first visor;
    a cylindrical sleeve attached to said first and second visors;
    a shaft rotatable and longitudinally slidable within said sleeve;
    cooperating means on said first and second visors for independently pivoting said visors with respect to one another in a controllable manner about said shaft;
    a plurality of channels formed circumferentially in the interior surface of said sleeve and extending substantially the length thereof;
    detent means on said shaft for engaging said channels to control rotational relationship between said shaft and said sleeve;

indentations formed in said channels and spaced along the lengths thereof for engaging said shaft detent means for maintaining selected longitudinal positions of said sleeve with respect to said shaft; and means for attaching said shaft to a vehicle for rotation about substantially horizontal and vertical axes.

3. An adjustable bidirectional vehicle visor as recited in claim 2 wherein:

said sleeve has at least one longitudinal channel formed in the interior surface thereof and extending substantially the length of said sleeve.

4. An adjustable bidirectional vehicle visor, comprising:

a visor support member attachable to a vehicle and pivotable about a substantially horizontal axis;

a first visor attached to said support member and pivotable thereon about an axis substantially perpendicular to said support member pivotal axis;

a second visor supported to overlay said first visor;

a cylindrical sleeve attached to said second visor;

a shaft rotatable and longitudinally slidable within said sleeve;

a plurality of longitudinal channels formed circumferentially in the interior surface of said sleeve and extending substantially the length thereof;

detent means on said shaft for engaging said channels to control rotational relationship between said shaft and said sleeve;

indentations formed in said channels and spaced along the length thereof for engaging said shaft detent means for maintaining selected longitudinal positions of said sleeve with respect to said shaft; and means for attaching said shaft to said visor support member.

* * * * *